C. C. BLAKE.
MACHINE FOR INSERTING FASTENINGS.
APPLICATION FILED SEPT. 27, 1917.

1,394,806.   Patented Oct. 25, 1921.

Fig 1

INVENTOR
Charles C. Blake
by Charles W. McDermott
his attorney

C. C. BLAKE.
MACHINE FOR INSERTING FASTENINGS.
APPLICATION FILED SEPT. 27, 1917.

1,394,806.

Patented Oct. 25, 1921.
7 SHEETS—SHEET 2.

Fig 2

INVENTOR
Charles C. Blake
by Charles W. McDermott
his attorney

C. C. BLAKE.
MACHINE FOR INSERTING FASTENINGS.
APPLICATION FILED SEPT. 27, 1917.

1,394,806.

Patented Oct. 25, 1921.

INVENTOR
Charles C. Blake
by Charles W. McDermott
his attorney

C. C. BLAKE.
MACHINE FOR INSERTING FASTENINGS.
APPLICATION FILED SEPT. 27, 1917.

1,394,806.

Patented Oct. 25, 1921.
7 SHEETS—SHEET 5.

INVENTOR
Charles C. Blake
by Charles W. McDermott
his attorney

C. C. BLAKE.
MACHINE FOR INSERTING FASTENINGS.
APPLICATION FILED SEPT. 27, 1917.

1,394,806.

Patented Oct. 25, 1921.
7 SHEETS—SHEET 7.

INVENTOR
Charles C. Blake
by Charles W. McDermott
his attorney

UNITED STATES PATENT OFFICE.

CHARLES C. BLAKE, OF BROOKLINE, MASSACHUSETTS.

MACHINE FOR INSERTING FASTENINGS.

1,394,806.  Specification of Letters Patent.  Patented Oct. 25, 1921.

Original application filed March 27, 1916, Serial No. 86,958. Divided and this application filed September 27, 1917. Serial No. 193,442.

*To all whom it may concern:*

Be it known that I, CHARLES C. BLAKE, a citizen of the United States, residing at Brookline, in the county of Norfolk and State of Massachusetts, have invented certain Improvements in Machines for Inserting Fastenings, of which the following description, in connection with the accompanying drawings, is a specification, like reference characters on the drawings indicating like parts in the several figures.

This invention relates to machines for inserting nails, tacks and other fastenings in the work and is particularly concerned with machines of this character designed for inserting fastenings in boots, shoes and other footwear. The invention will be herein disclosed as embodied in a mechanism designed to form a part of a heel lasting machine and adapted to insert fastenings in the upper after it has been manipulated into its lasted position for the purpose of holding it in that position.

The invention aims to device an efficient and reliable fastening-inserting machine which can be economically manufactured, and it also aims to provide means for automatically feeding the fastening-inserting mechanism along the work and to provide automatic features that will relieve the operator of much of the care and attention which otherwise would be required from him to keep the machine supplied with tacks, prevent breakage of the parts and maintain the machine in an efficiently operative condition. To the accomplishing of these and other objects which will hereinafter appear, the invention involves certain novel combinations and arrangements of parts and details of construction, the advantages of which will be readily understood by those skilled in this art.

Referring now to the accompanying drawings.

This application is a division of my copending application Serial No. 86,958, filed March 27, 1916, for improvements in heel lasting machines. Stated very briefly, the machine shown in said application comprises a work support in which the shoe to be lasted is mounted and a pair of wipers which are manipulated by the workman to updraw and overdraw a shoe upper at the heel end while the shoe is so supported. At the completion of the overdraw movement of the wipers these members lie within the outline of the shoe, leaving a narrow marginal strip of the overdrawn upper exposed to view between the outer edges of the wipers and the edge of the shoe. This strip of overdrawn upper is fastened to the insole while the wipers hold the upper in its overdrawn position by means of an automatic tacker embodying the present invention. This machine includes feeding means that transfers the point of operation of the fastening-inserting mechanism around the heel seat from one breast corner to the other. When it arrives at the latter point both the inserting mechanism and the feeding mechanism are automatically thrown out of action.

Inasmuch as the present application is concerned primarily with the tacking mechanism, the claims to be lasting mechanism *per se* being made in parent application above designated, only a very brief description of the lasting devices is necessary here. The machine illustrated performs the heel lasting operation on a shoe which has already been partially lasted and which comprises an upper 1, the forepart of which is held in partially lasted position against the edge face of the sole by a binder 2 secured in position by a clamp 3, the jaws of which embrace the opposite sides of the shoe. The shoe is mounted on a jack 4 which is supported on a flat table 7 carried by a head 8 secured on the base 9 of the machine. Suitable mechanism is provided to position the jack properly in the machine and to secure it in the correct position for the heel lasting operations.

The heel lasting instrumentalities are supported by a yoke 47 which is provided with a bridge 48 that forms a transverse arch over the bottom of the shoe being operated upon. This bridge supports a wiper carrier 49 from which two wipers 50 are suspended by means of struts 51, which are universally connected at their upper ends to the carrier 49 and at their lower ends to the wipers 50. These wipers comprise two sections jointed at 52, see Figs. 12 and 13, and each section carries a narrow spring metal finger 53, Fig. 19, which constitutes the active face of the wiper. The wipers are extending forwardly and terminate in handles 72 by means of which the operator is enabled to manipulate them to wipe the upper over the heel seat end of the last.

When the lasting movement of the wipers has been completed, the back or outer edges of these members lie within the outline of the shoe at the heel, leaving a narrow marginal strip of the overdrawn upper exposed to view between the outer edges of the wipers and the lateral edge of the shoe. This marginal strip of upper is secured to the heel seat end of the insole, while the wipers hold the upper clamped in its lasted position, by means of a traveling tacker which embodies the present invention. This tacker automatically drives tacks around the heel seat from one breast corner to the other through the strip of overdrawn upper lying just outside of the wipers.

The tacks are driven into the shoe by a driver 73, (Figs. 9 and 11) which operates through a throat 74 formed in a nozzle 75 supported from a head 76. The driver 73 is secured by a screw 77 to a slide 78 which is weighted by a weight 79. The slide 78 reciprocates in ways 80 formed in the head 76. To operate the driver the slide 78 is connected by a link 82 to the free end of a spring metal arm 83, the other end of which is secured to an arm 84 pivoted on a horizontal stud 85 secured to the head 76. The driver 73 is actuated to drive the tack by a spring 86 which is coiled about a rod 87 pivoted on the head 76 and loosely passed through a horizontal stud 87$^a$ on the arm 84. The spring 86 is interposed between the top of the stud 87$^a$ and a washer 88, on the rod, backed up by suitable adjusting and locking nuts 89. To compress the spring 86 for the driving stroke of the driver, the arm 84 carries a shouldered stud 90 which is positioned in a long slot formed in a connecting rod 91 pivoted at 92 on a crank arm 93. The crank arm 93 is loosely pivoted on a horizontal shaft 94 journaled in the head 76. The crank arm 93 is rotated in the direction of the arrow, Fig. 9, in order to elevate the arm 84 and thereby raise the driver and compress the spring 86, by means of a pin 95 arranged to engage the crank arm and carried by a disk 96 fast on the shaft 94. The pin 95 positively moves the crank arm 93 and the connecting rod 91 from the full line position (Fig. 9) to the dotted line position; but as soon as the crank arm 93 passes the center, the compressed spring 86 expands thus actuating the driver 73 to drive the tack. The connection of the arm 84 with the crank arm 93 moves the crank arm ahead of the pin 95 back to its initial position to be engaged again by the pin 95. The slot in the connecting rod 91 limits the driving movement of the driver 73 to the end of the nozzle 75, but the spring of the arm 83 allows the lower end of the driver 73 to project out of the nozzle 75 (Fig. 11) under the influence of the momentum of the weighted slide 78, thus insuring the driving of the tack by a whipping stroke. The slot in the connecting rod 91 also prevents breakage of the parts in case the driver gets stuck in its raised position.

Figures 6, 7:
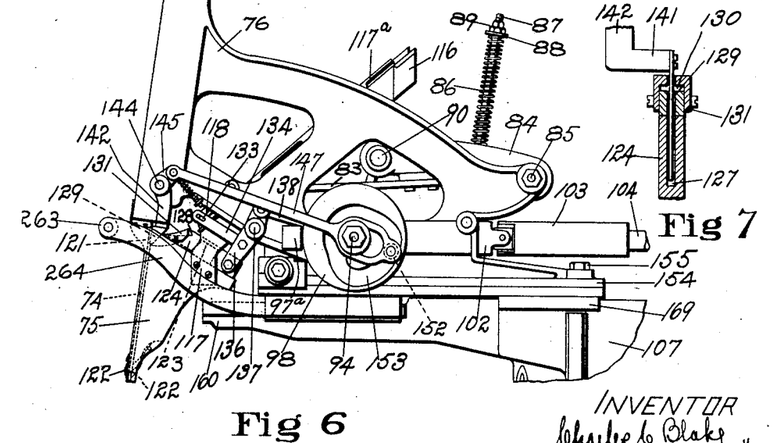
Fig. 6 is a side elevation of the tacker head showing the parts in the positions that they occupy when the tack is being driven.
Fig. 7 is a cross sectional view on the line 7—7, Fig. 4.

To prevent the compressed spring 86 from rotating the shaft 94 in a reverse direction when the machine is stopped with the spring 86 under compression, the right side of the head 76 carries a ball clutch 97 (Fig. 10) arranged to engage the peripheral edge of a disk 98 (Fig. 6) on the shaft 94. The ball clutch 97 permits the shaft to rotate in the direction of the arrow Fig. 9 but clutches the disk 98 when a tendency arises to rotate the shaft 94 in the reverse direction.

Figures 8, 9, 10, 11:
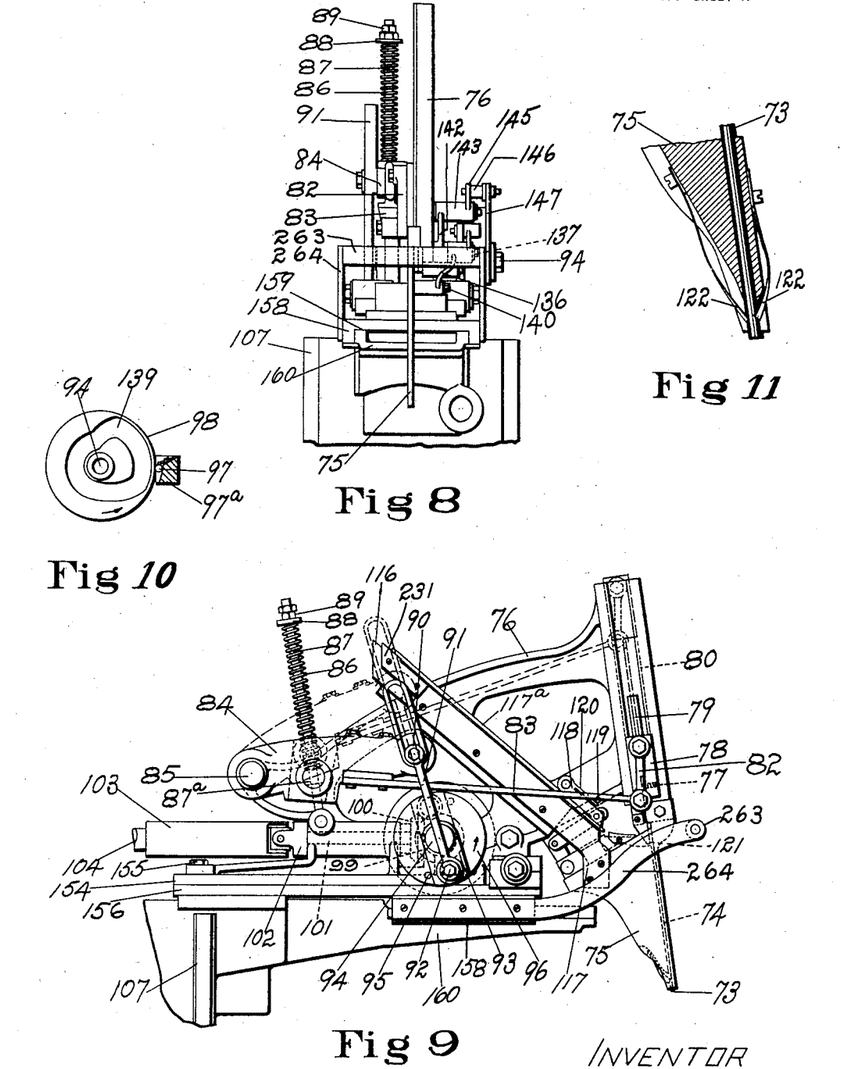
Fig. 8 is a front elevation of the tacker head.
Fig. 9 is a left side elevation of the tacker head.
Fig. 10 is a side elevation, partly in vertical cross section, of one of the cams for the tacker mechanism and the clutch that coöperates with it.
Fig. 11 is a vertical cross sectional view of the tack nozzle and the device for centering the tack therein.

The shaft 94 is provided with a bevel gear 99, Fig. 9, which meshes with a similar gear 100 on the end of a horizontal shaft 101 journaled in the head 76. The shaft 101 is connected by a universal joint 102 to a sleeve 103 (Fig. 14), splined to slide freely on a short shaft 104 which is connected by a universal joint 105 to a shaft 106 journaled in bearings supported on a vertical slide 107 (Fig. 17) mounted to slide in a column 108 (Fig. 1) carried by the base 9. The shaft 106 is provided with a bevel gear which meshes with a similar gear 109, Fig. 14, loosely mounted on a vertical shaft 110 passing loosely through a three-armed bearing 111 carried by the slide 107. The bevel gear 109 is provided with clutch teeth 112 adapted to be engaged by clutch teeth formed on a clutch sleeve 113 splined on the shaft 110. The shaft 110 is driven continuously during the operation of the machine through a worm gearing in connection with a horizontal shaft 114 (Fig. 2) driven by an electric motor 115 mounted on an extension of the base 9.

The tacks for fastening the overdrawn upper are carried in an inclined raceway 116 (Figs. 3, 4, 5 and 6) consisting of a pair of spaced plates secured to the head 76 and having extensions 117 (Fig. 4) thereon bolted to the nozzle 75. The roadway for the tacks between the plates is covered by a plate 117ᵃ which is spaced above the raceway to permit a free passage for the heads of the tacks. To hold the tacks in the raceway the head of the lowermost tack is engaged by a gate 118 (Figs. 4, 5 and 9) which is pivoted on the head 76 and normally is held in tack-engaging position by a pin 119 (Fig. 9) engaged with a fin 120 formed on the back of the gate. The tacks are withdrawn one at a time from the raceway 116 and delivered to the driver passage 121 (Fig. 9) in the throat 74, down which they fall until stopped by a pair of leaf springs 122 (Fig. 11), carried by the nozzle 75, which straighten the tacks to insure their proper engagement by the end of the driver.

Figure 4:
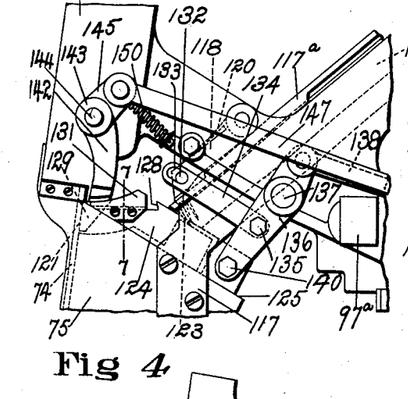
Figs. 4 and 5 are side elevations of certain parts of the tacker head showing some of the parts in different positions.
Figure 5:
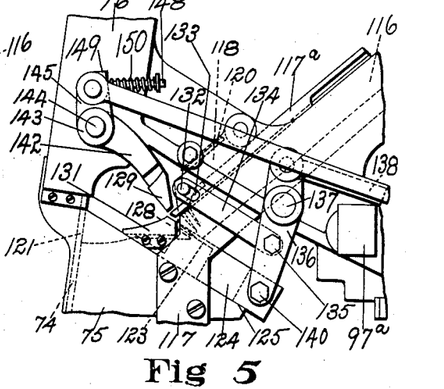

In order to properly handle a tack from the time it leaves the raceway until it is delivered to the throat 74, the nozzle 75 is extended rearwardly to form an inclined ledge 123 (Figs. 4 and 5) arranged beneath the end of the raceway 116 and substantially in the vertical plane thereof. The space between the bottom of the raceway and the upper surface of the ledge 123 is so small that but one tack at a time can fall from the raceway upon the ledge when the gate is periodically lifted during the operation of the machine. Mounted to straddle the stationary ledge 123 is a picker 124 (Figs. 4, 5 and 6) which reciprocates on the upper edge 125 of the nozzle 75 between the plates 117. The picker 124 is provided with a slot 127 (Fig. 7) which extends from the front end of the picker to a point near its rear end. Centrally located on the picker 124 is a shoulder 128 (Figs. 4, 5 and 6) shaped to engage beneath the head of a tack. When the gate 118 is elevated the lowermost tack in the raceway falls upon the picker 124 at the rear of the shoulder 128. The head of the tack rests upon the top of the picker and the shank of the tack passes through the slot 127 and rests upon the top of the ledge 123. Then the picker is moved rearwardly. The head of the tack resting on the top of the picker is prevented from moving rearwardly with the picker by its engagement with the forward end of the raceway. When the shoulder 128 moves back of the forward end of the raceway the head of the tack drops into the shoulder 128, whereupon the picker is moved forwardly carrying the tack with it. During the forward movement of the picker the shank of the tack drags over the ledge until it is withdrawn therefrom and then the tack swings into an upright position under the influence of gravity, the tack head resting upon the top of the picker in front of the shoulder 128. At this time a transferring device 129 (Figs. 4, 5 and 6) sweeps through the slot 127 and pushes the head of the tack through a guideway 130 (Fig. 7) formed between two plates 131 carried by the picker 124 and into the throat 74. As shown in Fig. 4, the transferring device 129 closes the slot 121 in the throat 74 at the end of the transferring movement and forms a continuation of the wall of the driver passage, thus obviating all danger of the point of the tack striking the floor of the slot 121 and becoming tipped across the throat and jammed therein upon the descent of the driver.

In order to elevate the gate 118 to release the end tack, the gate carries a pin 132 (Figs. 4, 5 and 6) which enters a slot 133 formed in one end of a link 134 pivoted on a stud 135 projecting laterally from a lever 136 pivoted at 137 on the head 76. The upper end of the lever 136 is connected to one end of a link 138, the other end of which is provided with a roll (not shown) engaged with a cam groove 139 (Fig. 10) formed in the inside face of the disk 98.

The picker 124 is reciprocated, in the manner described to pick the tack from the ledge 123 and position the tack for the operation of the transferring device 129, by the same lever 136 that operates the gate 118. To this end the lower end of the lever 136 is provided with a laterally extending stud 140 which is connected to the side of the picker. The times of operation of the gate 118 and picker 124 are such that the gate is elevated to permit a tack to drop off the end of the raceway 116 at about the end of the forward stroke of the picker, the difference in timing being permitted by the slot 133.

The transferring device 129 depends from a lateral extension 141 (Fig. 7) of an arm 142 (Figs. 4, 5 and 6) which depends from a sleeve 143 pivoted on a horizontal stud 144 on the head 76. A second arm 145 on the sleeve 143 carries a block 146 (Fig. 3) which is connected to a link 147 by a yielding connection to permit the transferring device to yield, if a tack becomes jammed in the slot 121, and thus prevent breakage. To this end a rod 148 (Fig. 3) connected to the block 146 passes loosely through an extension 149 on the link 147. Coiled around the rod 148 is a spring 150 interposed between the extension 149 and suitable adjusting and locking nuts 151 on the rod. The other end of the link 147 is slotted (Fig. 6) to embrace the shaft 94 and is provided with a roll 152 engaged with a cam groove 153 in the outside face of the disk 98.

Figure 1:
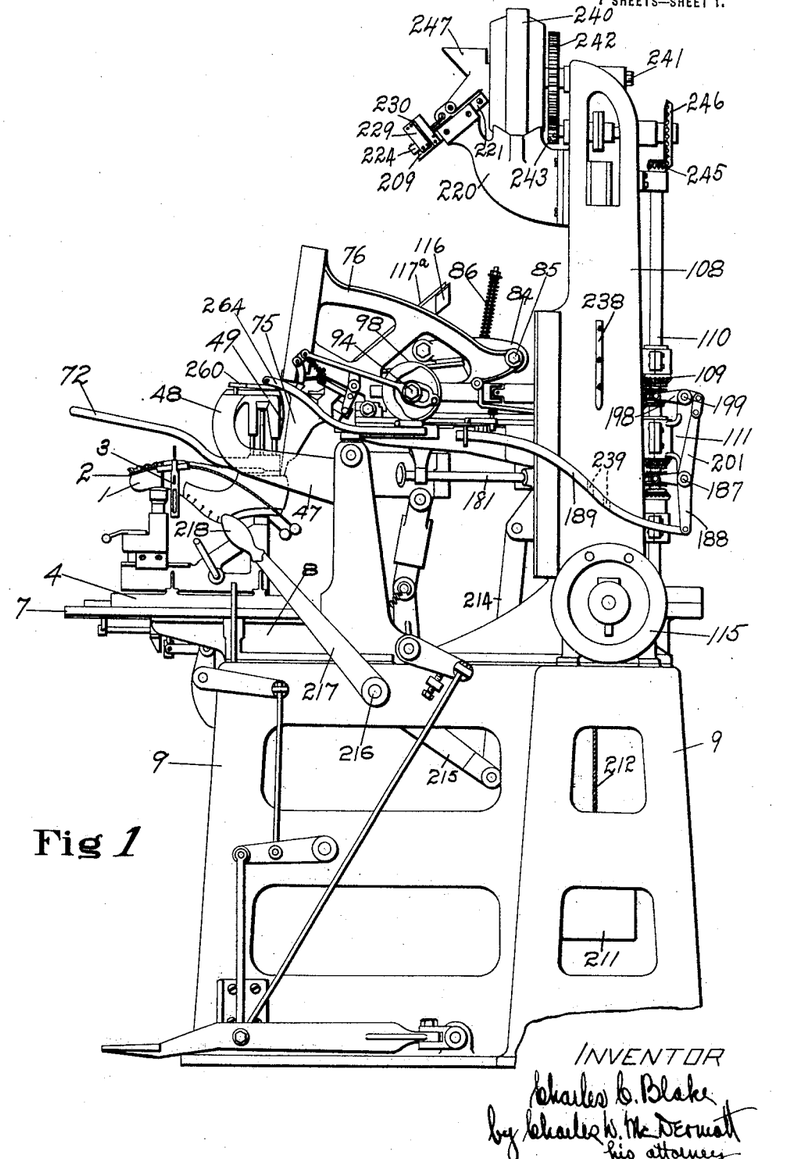
Figure 1 is a right side elevation of a heel lasting machine equipped with tacking mechanism embodying this invention.
Figure 2:
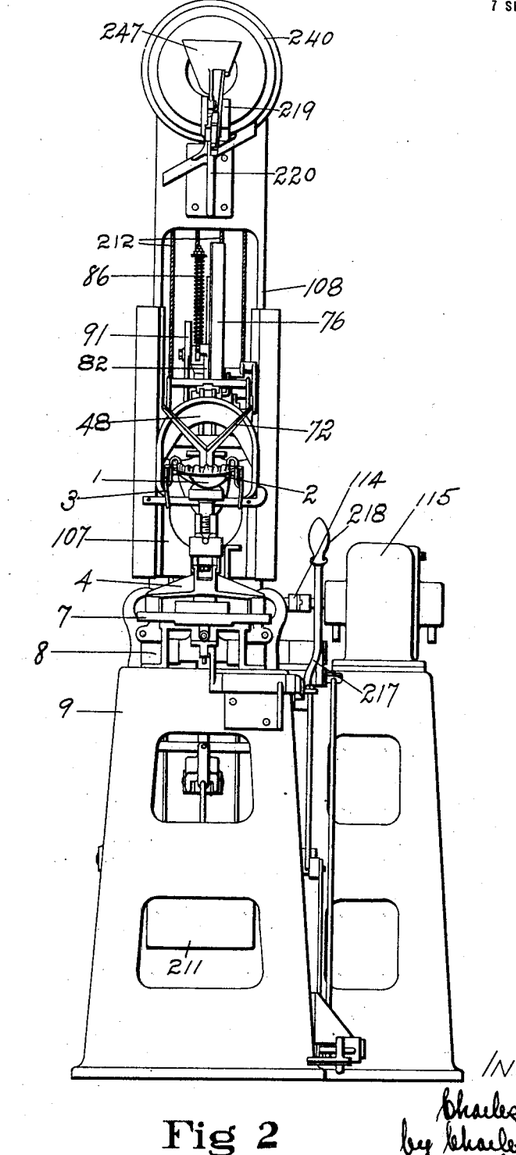
Fig. 2 is a front elevation of the machine shown in Fig. 1.
Figure 3:
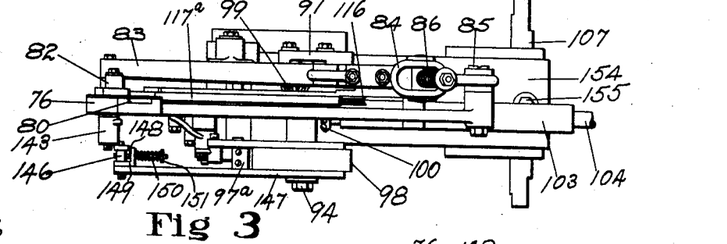
Fig. 3 is a plan view of the tacker head and the parts associated therewith.

The tacker is arranged to operate in the position shown in Fig. 1, hereinafter called "the fastening-inserting station," to drive tacks in the strip of overdrawn upper exposed on the shoe bottom between the outer edges of the wipers and the edge of the shoe bottom. While the tacker is driving tacks it is continuously moved around the heel seat of the shoe from one breast corner to the other. During this movement of the tacker the nozzle 75 is pressed laterally against the outer edges of the wipers so that during the traveling movement of the tacker the wipers act as a guide and the nozzle as a gage cooperating with the guide to direct the traveling movement of the tacker.

Figures 16, 17, 18, 19:
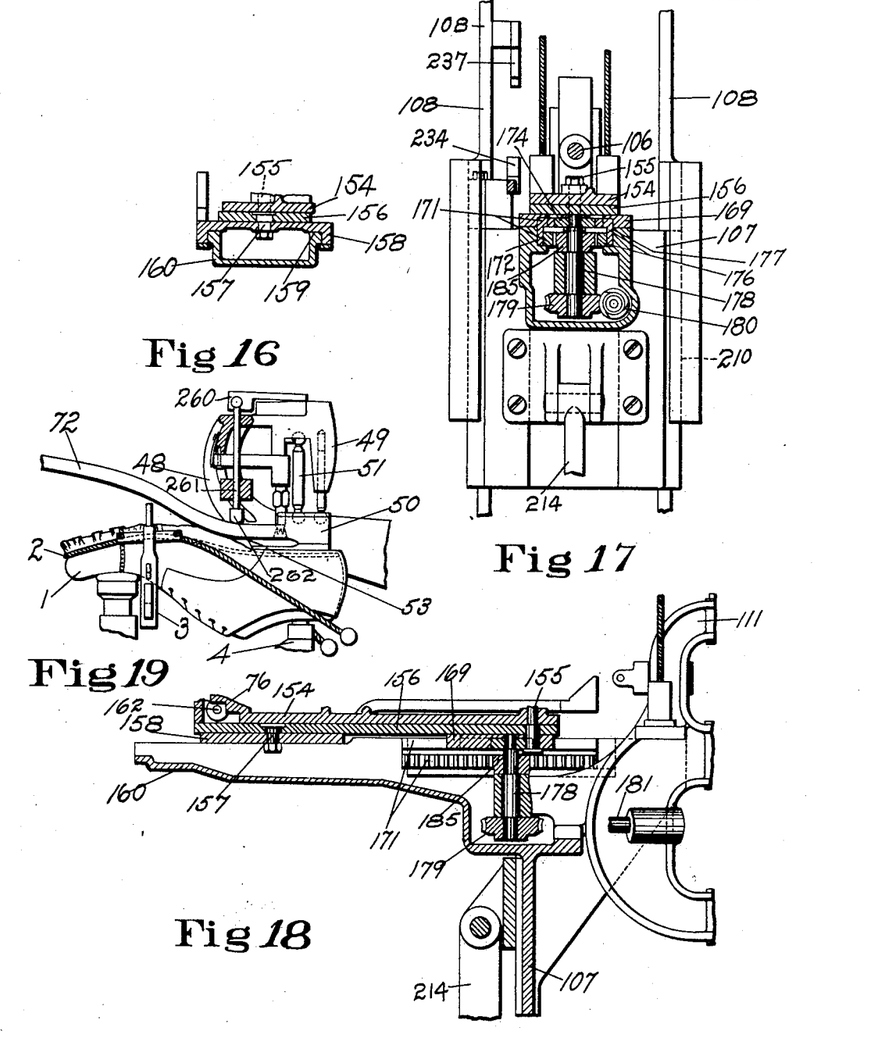
Fig. 16 is a vertical cross sectional view on the line 16—16, Fig. 13.
Fig. 17 is a front elevation, partly in cross section, on the line 17—17, Fig. 14.
Fig. 18 is a vertical, longitudinal, cross sectional view on the line 18—18, of Fig. 13.
Fig. 19 is a view, partly in side elevation and partly in vertical cross section, of certain of the lasting instrumentalities.

To press the nozzle 75 laterally against the back edges of the wipers the head 76 is carried upon a flat plate 154 (Fig. 18) which is pivoted at its rear end upon a pin 155 carried by a second flat plate 156. The plate 156 is pivoted near its front end upon a pin 157 carried by a slide 158 mounted to embrace and slide upon ways 159 (Fig. 16) formed in a horizontal extension 160 of the vertical slide 107. The plate 156 carries a spring chamber 161 (Fig. 12) in which is mounted a rod 162 that passes through the chamber 161 below the tacker head 76 (Fig. 18). Mounted on the rod 162 is a pair of sleeves 163 (Fig. 12) having heads 164 (Fig. 12) arranged to engage the tacker head 76. Coiled around each of the sleeves 163 is a spring 165 (Fig. 12) interposed between the head 164 and a washer 166, on the rod 162, which is held against the exterior of the spring chamber 161 by a nut 167.

In order to move the nozzle 75 around the heel seat of a shoe, the lower end of the pivot pin 155 passes loosely into a guideway 168 (Fig. 13) having substantially a horseshoe formation. The guideway 168 is formed in a plate 169 secured to the vertical slide 107. The pin 155 when positioned in one end of the guideway 168 fits into a semi-cylindrical notch 170 (Fig. 15) formed in a rack 171 (Fig. 13) mounted to slide in a way 172 formed in the extension 160. The rack 171 carries the pin 155 along the guideway to the juncture of the straight and curved portions thereof at which time a semi-cylindrical notch 173 formed in the peripheral edge of a rotary disk 174 (Figs. 13, 15 and 18) engages the pin 155 and removes it from the rack 171 and transfers the pin along the curved portion of the guideway 168. At the other juncture of the curved and straight portions of the guideway 168 the pin 155 leaves the notch 173 and enters a semi-cylindrical notch 175 (Fig. 15) formed in a rack 176 mounted to slide in a way 177 formed in the extension 160.

The nozzle 75 is thus transferred around the heel seat from one breast corner to the other breast corner. The guideway 168 is smaller than the tacking line on the smallest shoe operated on by the machine. The springs 163 by pressing the nozzle 75 laterally against the wipers permit the nozzle to traverse a path determined by the wipers for each shoe operated upon which will be different from the path determined by the guideway 168.

The disk 174 is mounted near the upper end of a vertical shaft 178 (Fig. 18) journaled in the extension 160. The lower end of the shaft 178 is provided with a worm wheel 179 which is driven by a worm 180 (Fig. 17) formed on a shaft 181. The shaft 181 is provided at its rear end with a bevel gear 182 (Fig. 14) which meshes with a pair of bevel gears 183 loosely journaled on the shaft 110 and bearing 111. Interposed between the bevel gears 183 is a clutch sleeve 184, splined on the shaft 110, having clutch teeth arranged to alternately engage similar teeth formed on the bevel gears 183. The shaft 178 also drives the racks 171 and 176 in opposite directions through a gear 185 on said shaft.

The nozzle 75 is transferred first from the breast corner A to the breast corner B (Figs.

12 and 13) in operating upon one shoe and then from the breast corner B to the breast corner A in operating upon the succeeding shoe. In order to shift the clutch sleeve 184 to drive the shaft 178 first in one direction to transfer the nozzle from A to B when operating upon one shoe and then in the other direction when operating upon the succeeding shoe the clutch sleeve 184 (Fig. 14) is embraced by a yoke 186 projecting from a rock shaft 187 journaled in the bearing 111. The rock shaft 187 is provided with a depending arm 188 which is connected to a sliding link 189 (Figs. 1 and 13), mounted to slide in an arm 190 secured to the extension 160. The link 189 is shifted in the arm 190 by a handle 191 which is secured to a plate 192 pivoted at 193 on the extension 160 and having a limited amount of play between lugs 194 and 195 (Fig. 13) in the link 189. The link 189 is normally held in neutral position with the clutch sleeve 184 disengaged from both of the bevel gears 183 by means of a spring latch 196, on the arm 190, which is arranged to engage the center one of the three notches 197 formed near the free end of the link 189. When the nozzle 75 is at the breast corner A and it is desired to start the machine to cause the nozzle to travel around the heel seat to the corner B, the handle 191 is pulled toward the operative thus causing the link 189 to slide forward to clutch the upper bevel gear 183 to the shaft 110. The clutch is held in by the latch 196 which rides out of the central notch 197 during the forward movement of the link and into the rear notch 197. When the nozzle 75 is to be moved from the breast corner B to the breast corner A, the handle 191 is pushed away from the operative thus clutching the lower bevel gear 183 to the shaft 110 and causing the latch to ride into the front notch 197.

Figure 14:
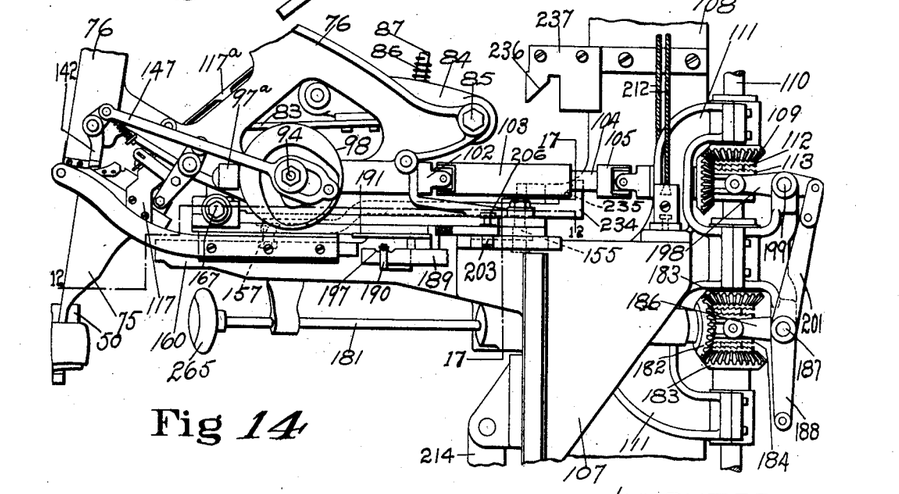
Fig. 14 is a right side elevation of part of the driving mechanism of the machine.

In order to simultaneously throw in the drive for the tack-inserting mechanism when the clutch sleeve 186 is moved in either direction, the clutch sleeve 113 is engaged by a yoke 198 (Fig. 14) carried by a rock shaft 199, and a toggle 201, one link of which is pivoted to an arm projecting from the yoke 198 and the other link of which is secured to the rock shaft 187, connects the yoke to the operating mechanism for the sleeve 186. When the clutch sleeve 186 is in neutral position the toggle 201 is straightened as shown in Fig. 14. When the clutch sleeve 186 is shifted in either direction to start the mechanism for feeding the tacker the toggle is broken, thus sliding the clutch sleeve 113 into engagement with the bevel gear 109 and thereby starting the tack-inserting mechanism.

In order to automatically stop the tacker when it reaches the breast corner B the plate 192 is provided with an incline 202 arranged in the path of movement of a stop pin 203 carried by an extension 204 from the plate 156. When the pin 203 engages the incline 202 the plate 192 is shifted on its pivot to move the link 189 rearwardly thus returning the clutch sleeve 184 to its neutral position and the latch 196 to the central notch 197. The tacker is automatically stopped when it reaches the breast corner A by a second incline 205 on the plate 192 which is engaged by the stop 203 to tip the plate 192 on its pivot and thus slide the link forwardly to bring the clutch sleeve 184 into its neutral position. As the lengths of the heel seats vary in different sizes of shoes it is desirable to vary the stopping position of the tack in accordance with the variations in the length of heel seat operated upon. To this end the pin 203 is carried by a block 206 which is mounted for adjustment along a slot 207 formed in the plate 204. The block 206 is adjusted in the slot 207 to vary the stopping point on shoes of different sizes by a screw 208, threaded into the block 206 and mounted on the plate 204.

When the nozzle 75 is located at the breast corner A the head 76 may be moved from the fastening-inserting station to a fastening-storage station where the raceway 116 is alined with a tack storage raceway 209 from which the supply of tacks in the raceway 116 may be replenished. To this end the slide 107 (Fig. 17) is mounted to move in vertical ways 210 formed in the column 108. The weight of the slide and its associated parts is counterbalanced by a weight 211 (Figs. 1 and 2) which is connected to the slide 107 by ropes 212 (Fig. 17) passing over pulleys 113 (Fig. 20) on the column 108. In order to move the slide 107 to position the tacker at the fastening-inserting station or at the fastening-storage station the slide 107 is connected to a link 214 (Fig. 1) the lower end of which is pivoted to an arm 215 projecting from a rock shaft 216 journaled in the base 9. A second arm 217 projecting form the rock shaft 216 is provided with a handle 218 in convenient position for manipulation by the operative.

The storage raceway 209 is loosely received between a pair of vertical plates 219 rising from an extension 220 of the column 108 of the machine. The raceway 209 is yieldingly held between the plates 219 by a leaf spring 221, one end of which is secured to the raceway 209 and the other end of which is secured to the plate 219 by a pair of screws 222 secured to one of the plates 219. The raceway 209 supports the heads of the tacks which are covered by a plate 223 spaced from the raceway. The tacks in the storage raceway 209 are normally held therein by a gate 224 which is pivoted at 225 on one of the plates 219. The gate 224 is normally held in tack-retaining position by a leaf spring 226 secured to the back of the gate and arranged to engage a pin 227 on one of the plates 219. The shanks of the tacks depending through the roadway near the end of the raceway 209 are alined with the roadway by a pair of wedge-shaped blocks 228 (Fig. 25) which are supported at the lower ends of leaf springs 229 supported at their upper ends by a bridge 230 secured to the raceway 209. When the raceway of the fastening-inserting machine (above mentioned) is brought to the fastening-storage station a fin 231 on said raceway 116 engages a pin 232 on the gate 224 and raises the gate against the tension of the spring 226. At the same time the upper end of the raceway engages the wedge blocks 228 and spreads them apart, thus permitting the alined tacks to slide from the storage raceway 209 into the raceway of the fastening-inserting machine 116. When the latter raceway 116 is withdrawn from the raceway 209 the gate 224 and blocks 228 return to their initial positions under the influence of the springs 226 and 229, respectively, in readiness to act upon a new lot of tacks delivered to the raceway 209 for storage.

Figures 12, 15:
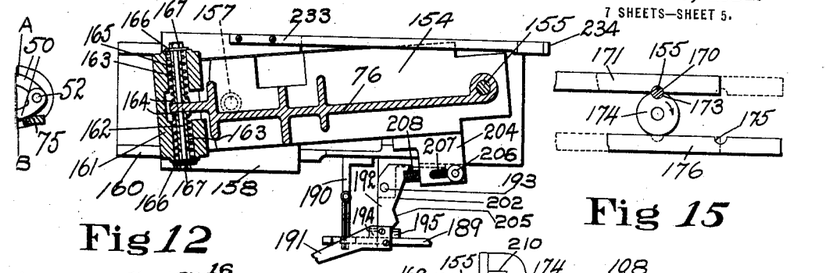
Fig. 12 is a plan view, partly in cross section, of the slides for supporting and guiding the tacker head.
Fig. 15 is a diagrammatic plan view of part of the actuating mechanism for feeding the tacker.
Figure 13:
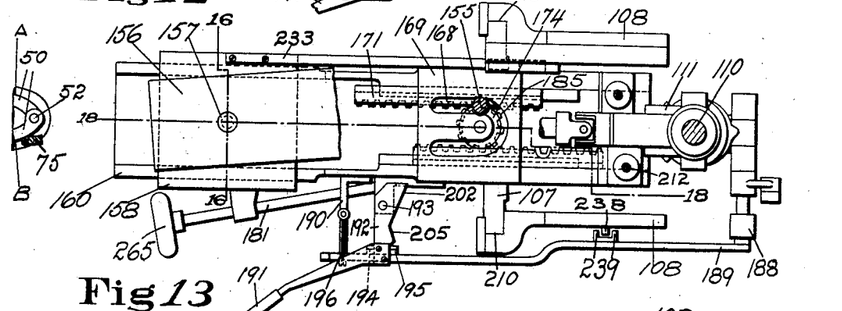
Fig. 13 is a plan view of certain of the actuating devices for feeding the tacker.

The raceway 116 is in line with the storage raceway 209 only when the nozzle 75 at the fastening-inserting station is located at the breast corner A (Figs. 12 and 13). As the breast corner A will vary with different shoes it is desirable to provide some means for positively limiting the elevated position of the raceway 116 so that it will always be in line with the raceway 209 whether the shoe last operated upon is large or small. To this end the slide 158 carries an arm 233 (Fig. 12) which is provided at its free end with a block 234 (Fig. 14) having an inclined face 235 arranged to coöperate with an inclined face 236 on a block 237 carried by the column 108. The inclines of the faces 235 and 236 are parallel to the incline of the raceways 116 and 209 so that the raceways 116 and 209 will always aline when the raceway 116 is moved into the fastening-storage station notwithstanding variations in the stopping position of the nozzle 75 at the breast corner A for different sizes of shoes.

In order to provide means for automatically bringing the starting and stopping link 189 into neutral position when the tacker head is elevated, during its operation, to withdraw it from the fastening-inserting station, the column 108 carries a rib 238, (Fig. 1) having a V-shaped end which enters the space between a pair of blocks 239 on the link 189. If the driving mechanism for the tacker is stopped when the tacker head is elevated the rib 238 enters the slot between the two blocks 239 and prevents the starting of the driving mechanism for the tacker while it is moving toward or from the storage station. If the driving mechanisms for the tacker are in operation when the tacker head is elevated, the lower end of the rib 238 wedges itself between the blocks 239 and shifts the link 189 into neutral position from either its advanced or its retracted position.

In order to supply the storage raceway 209 with tacks, the column 108 supports a hopper 240 which is rotatably mounted on one end of a stub shaft 241 secured to the column. A gear 242, secured to the hopper 240 and loosely mounted on the shaft 241, meshes with a pinion 243, on a shaft 244, journaled in the column 108 and driven from a vertical shaft 110 by bevel gears 245 and 246 on the shafts 110 and 244, respectively. The hopper 240 is thus continuously rotated during the operation of the machine and keeps the mass of tacks in the bottom of the hopper in motion. The tacks are inserted in the hopper through a filling funnel 247 which is pivoted on one of the plates 219 so that it may be tipped back to expose an opening 248 in the front face of the hopper for the purpose of inspection or repair.

Two buckets or pickers 249 each of which carries a pair of rails 250 spaced apart to provide a tack slot 251 therebetween are mounted in the hopper. The buckets 249 are each provided with sloping walls designed to direct the points of the tacks caught by the buckets into the slot 251. With this construction the buckets 249 are alternately passed through the mass of tumbled tacks in the hopper. Some of the shanks of the tacks will be deflected by the sloping walls 252 into the slot 251, and the heads of these tacks will rest on the rails 250 until, during the rotation of the hopper, the ends of the rails register with a curved stationary raceway mounted on the end of the stationary shaft. Then the tacks assembled on the rails 250 will slide therefrom into the raceway 253. The lower end of the raceway 253 and the upper end of the raceway 209 are separated by a gap 254 (Fig. 21) and the inclines of the raceways are such that the tacks delivered to the raceway 253 will jump the gap and pass into the raceway 209 under the force of gravity. When the storage raceway 209 is full of tacks the tacks from the raceway 253 spill into the hopper 240.

Figures 20, 21, 22, 23, 24, 25, 26, 27:
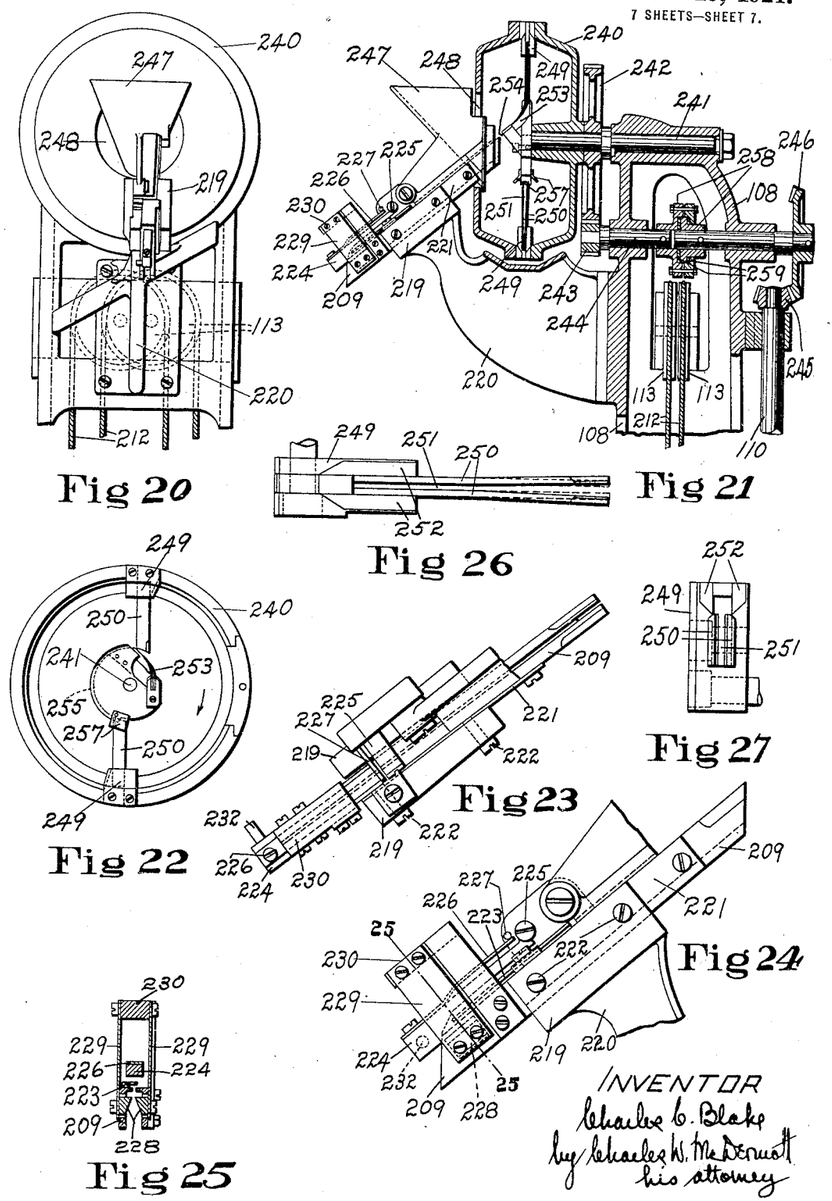
Fig. 20 is a front elevation of the tack-handling mechanism.
Fig. 21 is a vertical cross sectional view, partly in side elevation, of the mechanism shown in Fig. 20.
Fig. 22 is a front elevation of the rotating hopper with the front section thereof removed.
Fig. 23 is a plan view of the tack-storage raceway.
Fig. 24 is a side elevation of the raceway shown in Fig. 23.
Fig. 25 is a cross sectional view on the line 25—25, Fig. 24.
Fig. 26 is a front view of one of the buckets or pickers with which the hopper is equipped.
Fig. 27 is a rear elevation of the device shown in Fig. 26.

In order to insure that no tacks will remain on the rails 250 after they pass the point of registration with the raceway 253 the lower ends of the rails 250 are permitted to spring apart as shown in Fig. 26, after the point of registration with the raceway 253 has been passed, to dump all the tacks remaining on the rails into the hopper. To wedge them back into a position in which they will properly support the heads of the tacks the support for the raceway 253 is provided with a curved way 255 (Fig. 22) having sloping walls at its entrance. The ends of the rails 250 engage the sloping walls and are wedged thereby toward each other into the dotted line position (Fig. 26). The way 255 then holds the rails 250 with the proper space between them until the point of registration with the raceway 253 is passed when the rails 250 pass out of the way 255 and spring apart to dump any tacks still held on the rails. The entrance to the way 255 is guarded by a pair of spring metal flaring wings 257 which prevent a tack from jamming between the entrance to the way 255 and the rails 250.

In order to prevent breakage of the parts in case a tack becomes jammed in the mechanism a friction drive is provided for the hopper. For this purpose the shaft 244 is made in two parts (Fig. 21), each part having a collar 258 thereon. Between these collars a leather disk 259 is pinched, the construction being such that the disk 259 permits the left hand collar to slip relatively to its companion when a jammed tack stops the rotation of the hopper.

It is found that the heel seats of some shoes slope upwardly from the breast line toward the back of the shoes, while in others the heel seat slope upwardly from the back of the shoe toward the breast line. In order to maintain the nozzle 75 at a uniform distance above the work notwithstanding these variations in the slope of the heel seats, the machine of the drawings is provided with a cam 260 (Fig. 19) comprising a flat plate, loosely mounted on the top of the bridge 48. The cam 260 is pivoted on a pair of vertical rods 261 mounted to slide through the bridge 48. The lower ends of the rods 261 carry a horizontal bar 262 extending transversely of the shoe. The cam 260 is engaged by a horizontal gage rod 263, Fig. 6, which is supported between a pair of arms 264 secured to the slide 158. In its normal position upon the top of the bridge 48 the cam 260 is inclined to maintain the nozzle 75, through the height gage 263, at a uniform height above the heel seat of a shoe which slopes upwardly from the breast line to the back of the shoe. When the heel seat of a shoe operated upon is in a horizontal plane or slopes upwardly from the back of the shoe to the heel seat the handles 72, of the wipers, as they move over the shoe bottom during the wiping movement of the wipers engage the bar 262 and elevate the pivoted end of the cam 260 and thereby incline the cam 260 on the top of the bridge 48 to position the surface engaged by the gage 263 parallel to the heel seat engaged by the wipers.

In its normal idle position the tacker head 76 is at the fastening-storage station with the raceways 116 and 209 engaged to permit tacks to slide from the raceway 209 into the raceway 116. The electric motor is now thrown in to rotate the hopper 240 to supply the raceway 209 with tacks. A partially lasted shoe is next jacked on a leader and positioned upon the table 7 in readiness for the heel lasting operation. This operation is accomplished by manipulating the handles 72 to cause the wipers to slide upwardly over the lateral faces of the heel and stretch the upper thereover and then wipe the upper over upon the heel seat. During the closing movement of the handles 72 they engage the bar 262 and adjust the cam 260 into a position substantially parallel to the longitudinal plane of the heel seat.

The handle 218 (Fig. 1) is next elevated to withdraw the tacker head 76 from the fastening-storage station and to position the nozzle 75 at the breast corner A on the heel seat. The handle 191 (Fig. 13) is then pulled toward the operative to throw in the driving mechanisms for inserting the tacks and for feeding the tacker. The nozzle 75 then begins to travel around the wiper and during this movement the tacks are inserted in the heel seat to secure the overdrawn upper which is held in lasted position by the wipers. When the nozzle 75 approaches the breast corner B the pin 203 (Fig. 14) engages the incline 202 and throws out the driving mechanisms for inserting tacks and for feeding the tacker.

The handle 218 is now depressed to elevate the tacker head 76 a short distance to bring the nozzle 75 above the wipers. The shoe is next released and removed from the machine and the wipers returned to their original inoperative positions. Another shoe is then positioned on the table 7 and the heel lasted. When the nozzle 75 is engaged with the work and the driving mechanisms therefor thrown into operation the traveling tacker will insert tacks from the breast corner B to the breast corner A, at which point the driving mechanisms will be automatically thrown out through the engagement of the pin 203 with the incline 205. When the nozzle 75 is again elevated to clear the wipers, advantage may be taken of its alinement with the raceway 209 to return the raceway 116 to the fastening-storage station and thus replenish the supply of tacks in the raceway 116.

The nozzle 75 may be fed by hand, when the driving mechanism therefor is thrown out of operation, through a handle 265, (Fig. 14) on the end of the shaft 181.

It will be apparent to those skilled in this class of machines that changes may be made in the details of construction, the described and illustrated embodiment of the invention being intended as an exploitation of its underlying essentials, the features whereof will be definitely stated in their true scope in the claims hereto appended. The tack handling mechanism herein disclosed is not claimed in this application but it forms the subject matter of an independent application.

What is claimed as new is:

1. A shoe machine, having, in combination, operating means including a gage, mechanism tending to move the gage through a predetermined path, including a slide movable in a fixed path, a second slide pivoted on the first slide, and a third slide carrying the operating means pivoted on the second slide; and means for yieldingly holding the third slide in a normal central position on the second slide, substantially as described.

2. A shoe machine, having, in combination, operating means, mechanism tending to move the operating means through a predetermined path comprising a guideway having the shape of the predetermined path, a pin mounted to slide in the guideway, a pair of racks movable in opposite directions, and a rotary disk arranged to coöperate with one rack to embrace the pin at one time during its rotation and to coöperate with the other rack to embrace the pin at a different time during the rotation of the disk, substantially as described.

3. A shoe machine, having, in combination, a shoe support; means for operating around the heel seat of the shoe on the support; mechanism tending to move the operating means through a predetermined path comprising a guideway having substantially a horse-shoe shape; a device mounted to slide in the guideway; a pair of racks for transferring the device along the substantially straight portions of the guideway; and a rotary disk for transferring the device around the curved portion of the guideway, substantially as described.

4. A machine for inserting fastenings, having, in combination, a driver, a spring for actuating the driver during a part of its driving movement, and connections between the spring and the driver constructed to permit independent movement of the driver during another part of its driving movement, substantially as described.

5. A machine for inserting fastenings, having, in combination, a driver, a spring for actuating the driver during a part of its driving movement, and connections between the spring and the driver permitting the driver to travel under its acquired momentum during another part of its movement, substantially as described.

6. A machine for inserting fastenings, having, in combination, a driver; a spring for actuating the driver; and mechanism for tensioning the spring comprising a shaft, a crank pin driven thereby, and a connecting rod loosely carried by the shaft and arranged to be actuated by the pin during a portion of the rotation of the shaft, substantially as described.

7. A machine for inserting fastenings, having, in combination, a driver; a spring for actuating the driver; and mechanism for tensioning the spring comprising a pivoted arm bearing against the spring, a shaft, a crank pin driven thereby and a connecting rod loosely carried by the shaft arranged to be actuated by the pin during a portion of the rotation of the shaft and having a slot and pin connection with the pivoted arm, substantially as described.

8. A machine for inserting fastenings, having, in combination, a driver; a slide therefor; a spring for actuating the driver; and connections between the spring and the slide comprising a pivoted arm bearing against the spring, a spring metal arm connected to the pivoted arm and a link connection between the slide and the spring metal arm, substantially as described.

9. A machine for inserting fastenings, having, in combination, a driver, a spring for actuating the driver, mechanism for tensioning the spring comprising a driving shaft rotating during the operation of the machine in one direction, and means for preventing the rotation of the shaft in the opposite direction under the influence of the tensioned spring when the machine is stopped but offering no substantial resistance to the normal rotation of said shaft, substantially as described.

10. A machine for inserting fastenings, having, in combination, a raceway, a throat having a fastening-receiving slot extending laterally therefrom, and mechanism for withdrawing a fastening from the raceway and delivering it through said slot to the throat comprising a transferring device constructed to introduce the fastening into the slot and said slot when it opens into the throat, substantially as described.

11. A machine for inserting fastenings, having, in combination, a raceway, a gate for holding fastenings on the raceway, a ledge arranged beneath the raceway, a slotted picker having a shoulder centrally located thereon constructed to engage the head of a fastening, mechanism for operating the gate to permit a fastening to drop off the end of the raceway down upon the picker in the rear of the shoulder thereon with the shank of the fastening passing through the slot in the picker and resting upon the ledge, and mechanism for operating the picker first in a direction to engage the head of the fastening with the shoulder and then in a direction to withdraw the shank of the fastening from the ledge to permit the fastening to swing into the slot in front of the shoulder, substantially as described.

12. A machine for inserting fastenings, having, in combination, a raceway, a gate for holding the fastenings on the raceway, a picker, a cam, a pivoted bell crank lever one end of which is connected to the picker and the other end of which is operated by the cam, and a link having one end connected to the bell crank lever between its pivot and its connection with the picker and having at its other end a slot and pin connection with the gate, substantially as described.

13. A machine for inserting fastenings, having, in combination, means for inserting fastenings, and mechanism for moving the inserting means around the heel of a shoe from one breast corner to the other comprising a pair of racks movable in opposite directions, substantially as described.

14. A machine for inserting fastenings, having, in combination, means for inserting fastenings; and mechanism for moving the inserting means around the heel of the shoe from one breast corner to the other comprising a pair of racks movable in opposite directions, a slideway adjacent the racks, a pin mounted to slide in the slideway, and a transferrer for transferring the pin in the slideway from one rack to the other rack, substantially as described.

15. A machine for inserting fastenings, having, in combination, means for inserting fastenings, and mechanism for moving the inserting means around the heel of a shoe from one breast corner to the other comprising a pair of racks movable in opposite directions, each rack having a notch in one face, a slideway adjacent the racks, a pin mounted to slide in the slideway arranged to engage a notch in one of the racks, and a transferrer for removing the pin from the notch in one of the racks and positioning it in the notch in the other rack substantially as described.

16. A machine for inserting fastenings, having, in combination, means for inserting fastenings, mechanism for moving the inserting means around the heel of a shoe from one breast corner to the other comprising a pair of racks movable in opposite directions, each rack having a notch in one face, a slideway adjacent the racks, a pin mounted to slide in the slideway arranged to engage a notch in one of the racks, and a rotary disk for removing the pin from the notch in one of the racks and positioning it in the notch in the other rack, substantially as described.

17. A machine for inserting fastenings, having, in, combination, means for inserting fastenings, and mechanism for moving the inserting means around the heel of a shoe from one breast corner to the other comprising a pair of racks movable in opposite directions, each rack having a semi-circular notch in one face, and a rotary disk having a semi-circular notch in its edge arranged to register at different times with the notches in the racks, substantially as described.

18. A machine for inserting fastenings, having, in combination, a shoe support, a tack nozzle movable over the shoe bottom, and means for maintaining the tack nozzle at a uniform distance above the shoe bottom during its movement thereover, substantially as described.

19. A machine for inserting fastenings, having, in combination, a shoe support, a tack nozzle movable around the heel of the shoe from one breast corner to the other, and means for maintaining the tack nozzle at a uniform height above the shoe bottom during its movement along the sloping shoe bottom, substantially as described.

20. A machine of the class described, having, in combination, means for inserting fastenings including a height gage, and a cam automatically comformable to the slope of the work coöperating with the gage to control the height above the work at which the inserting means operates, substantially as described.

21. A machine of the class described, having, in combination, means for inserting fastenings including a height gage, a cam automatically conformable to the slope of the work coöperating with the gage to control the height above the work at which the inserting means operates, and means for relatively actuating the gage and cam to transfer the point of operation of the gage over the cam, substantially as described.

22. A machine of the class described, having, in combination, means for inserting fastenings including a height gage and a nozzle, means for feeding the nozzle over the work, and a cam coöperating with the gage to control the height above the work at which the nozzle operates during its feed, substantially as described.

23. A shoe machine, having, in combination, means for inserting fastenings, means for feeding the inserting means, a main driving shaft, a shaft driven therefrom for driving the inserting means, a shaft driven from the driving shaft for driving the feeding means, a clutch for clutching the inserting means shaft to the driving shaft, a pair of clutches for clutching the feeding means shaft to the driving shaft, mechanism for operating one of the pairs of clutches at a time to throw in the feeding means, and connections from said mechanism to the first-named clutch for throwing in the inserting means when either of the pairs of clutches is operated to drive the feeding means, substantially as described.

24. A shoe machine, having, in combination, a fastening-storage means, means for inserting fastenings movable from the fastening storage means to fastening inserting position, manual means for throwing in the inserting means when the inserting means is in fastening-inserting position, and automatic means for throwing out the inserting means when it is moved away from fastening inserting position, substantially as described.

25. A shoe machine, having, in combination, a fastening-storage means, means for inserting fastenings movable from the fastening storage means to fastening inserting position, manual means for throwing in the inserting means, and mechanism for preventing the operation of said manual means when the inserting means is in position to receive fastenings from the storage means, substantially as described.

26. A shoe machine, having, in combination, a fastening-storage means, means for inserting fastenings movable from the fastening storage means to fastening inserting position, means for feeding the inserting means, a driving mechanism for said means, manual means for throwing in the driving mechanism when the inserting means is in fastening inserting position, and automatic means for throwing out the driving mechanism when the inserting means is moved away from fastening inserting position, substantially as described.

27. A shoe machine, having, in combination, a fastening-storage means, means for inserting fastenings movable from the fastening storage means to fastening inserting position, manual means for throwing in the inserting means, automatic mechanism for throwing out the inserting means to terminate its operation, and additional automatic mechanism for throwing out the inserting means when it is moved away from fastening inserting position, substantially as described.

28. A shoe machine, having, in combination, a fastening-storage means having a raceway, means for inserting fastenings including a raceway movable from the fastening storage means to fastening inserting position, and means for preventing the movement of the inserting means to receive fastenings from the storage means when the raceways are out of line, substantially as described.

29. A shoe machine, having, in combination, a fastening-storage means having a raceway, means for inserting fastenings including a raceway movable from the fastening storage means to fastening inserting position, a gate on the first raceway, and means on the second raceway for operating the gate when the inserting means is in engagement with the fastening-storage means, substantially as described.

30. A machine for inserting fastenings, having, in combination, a shoe support, means for inserting fastenings in the shoe, means for actuating the inserting means to feed it along the work alternately in opposite directions, and a single stop constructed and arranged to stop the movement of the inserting means at the end of its movement in either direction, substantially as described.

31. A machine for inserting fastenings, having, in combination, a shoe support, means for inserting fastenings in the shoe, means for actuating the inserting means to feed it along the work alternately in opposite directions including an adjustable pin, and a single stop constructed and arranged to engage the pin at the end of the movement of the inserting means in either direction, substantially as described.

32. A machine for insering fastenings, having, in combination, a shoe support, means for inserting fastenings in the shoe, means for actuating the inserting means to feed it along the work alternately in opposite directions including an adjustable pin, and a stop having a pair of inclined faces one face engaging the pin at the end of the movement of the inserting means in one direction and the other face engaging the pin at the end of the movement of the insering means in the other direction, substanially as described.

33. A machine for inserting fastenings, having, in combination, a raceway, a throat having a fastening-receiving opening, a gate for holding fastenings on the raceway, a ledge arranged beneath the raceway, a slotted picker having a shoulder centrally located thereon constructed to engage the head of a fastening, mechanism for operating the gate to permit a fastening to drop off the end of the raceway down upon the picker in the rear of the shoulder thereon with the shank of the fastening passing through the slot in the picker and resting upon the ledge, mechanism for operating the picker first in a direction to engage the head of the fastening with the shoulder and then in a direction to withdraw the shank of the fastening from the ledge to permit the fastening to swing into the slot in front of the shoulder, and a transferring device operating in the slot in the picker for delivering the fastening to the throat and closing the opening in the throat, substantially as described.

34. A machine for insering fastenings, having, in combination, a fastening-storage means having an inclined raceway, means for inserting fastenings including an inclined raceway movable from the fastening storage means to fastening inserting position, means for feeding the inserting means while in fastening inserting position through variable distances to accommodate the inserting means to different pieces of work, and means for insuring the alinement of the raceways to receive fastenings from the fastening-storage means notwithstanding the variations in the length of feed of the inserting means in fastening inserting position, substantially as described.

35. A machine for inserting fastenings, having, in combination, a fastening-storage means having an inclined raceway, means for inserting fastenings including an inclined raceway movable from the fastening storage means to a fastening inserting position, means for feeding the inserting means while in fastening-inserting position through variable distances to accommodate the inserting means to different pieces of work, a stop having an inclined face parallel to the inclined raceway on the fastening-storage means and having a fixed position relatively to the fastening-storage means, and a second stop coöperating with the first, moving with the inserting means and provided with an inclined face parallel to the inclined face on the first stop for insuring the alinement of the raceways at the fastening-storage means nowithstanding the variations in the length of feed of the inserting means while in fastening-inserting position, substantially as described.

In testimony whereof I have signed my name to this specification.

CHARLES C. BLAKE.